United States Patent
Sutton

(10) Patent No.: US 10,652,398 B2
(45) Date of Patent: May 12, 2020

(54) SYSTEMS AND METHODS TO DISRUPT PHASE CANCELLATION EFFECTS WHEN USING HEADSET DEVICES

(71) Applicant: Theater Ears, LLC, Boca Raton, FL (US)

(72) Inventor: Chris Sutton, Los Angeles, CA (US)

(73) Assignee: THEATER EARS, LLC, Boca Raton, FL (US)

(*) Notice: Subject to any disclaimer, the term of this patent is extended or adjusted under 35 U.S.C. 154(b) by 32 days.

(21) Appl. No.: 15/688,819

(22) Filed: Aug. 28, 2017

(65) Prior Publication Data

US 2019/0068790 A1    Feb. 28, 2019

(51) Int. Cl.
| | | |
|---|---|---|
| *H04M 9/08* | (2006.01) | |
| *H04M 1/60* | (2006.01) | |
| *H04R 5/033* | (2006.01) | |
| *G10K 11/178* | (2006.01) | |
| *H04B 1/10* | (2006.01) | |

(Continued)

(52) U.S. Cl.
CPC .......... *H04M 9/082* (2013.01); *H04B 1/1036* (2013.01); *H04M 1/035* (2013.01); *H04M 1/6016* (2013.01); *H04M 1/6058* (2013.01); *H04R 1/1083* (2013.01); *H04R 1/32* (2013.01); *H04R 29/002* (2013.01); *G10K 11/178* (2013.01); *G10K 11/17885* (2018.01); *G10K 2210/1081* (2013.01); *G10K 2210/3017* (2013.01); *G10K 2210/30232* (2013.01);

(Continued)

(58) Field of Classification Search
CPC .... H04M 9/082; H04M 1/035; H04M 1/6016; H04M 1/6058; H04M 1/6008; G10K 11/178; G10K 2210/1081; G10K 2210/3017; G10K 2210/30232; G10K 11/17885; H04B 1/1036; H04R 1/32; H04R 1/1083; H04R 29/002; H04R 5/033; H04R 2420/01; H04R 2460/01
USPC .......... 381/71.6, 71.1, 71.8, 120; 455/67.16, 455/556.1
See application file for complete search history.

(56) References Cited

U.S. PATENT DOCUMENTS

| | | | | |
|---|---|---|---|---|
| 4,773,094 | A | * | 9/1988 | Dolby .................. G11B 20/182 381/58 |
| 6,154,427 | A | * | 11/2000 | Yokota ............. G11B 20/10527 360/22 |

(Continued)

*Primary Examiner* — Vivian C Chin
*Assistant Examiner* — Con P Tran
(74) *Attorney, Agent, or Firm* — Steven M. Greenberg, Esq.; Shutts & Bowen LLP

(57) ABSTRACT

In applications where assisted listening headphones are worn inside of a theater, phase cancellation effects cause the headset wearer to perceive the audio as reduced in volume and distorted. These undesirable phase cancellation effects may be disrupted through preprocessing or real time processing of the headset audio track by summing acoustical noise with the original headset audio track and providing this altered audio track to the headset. The acoustical noise is modulated such that it is imperceptible to the headset wearer while at the same time disrupting undesirable phase cancellation effects, which would otherwise occur if the headset audio track was provided unaltered. Thus, the preprocessing of the headset audio preserves the integrity of the intended headset audio, as perceived by the headset wearer, in headsets worn in a theater environment.

10 Claims, 3 Drawing Sheets

(51) Int. Cl.
*H04M 1/03* (2006.01)
*H04R 1/32* (2006.01)
*H04R 29/00* (2006.01)
*H04R 1/10* (2006.01)

(52) U.S. Cl.
CPC .......... *H04M 1/6008* (2013.01); *H04R 5/033* (2013.01); *H04R 2420/01* (2013.01); *H04R 2460/01* (2013.01)

(56) References Cited

U.S. PATENT DOCUMENTS

| | | |
|---|---|---|
| 7,995,770 B1 | 8/2011 | Simon |
| 8,143,620 B1 | 3/2012 | Malinowski et al. |
| 2003/0235312 A1* | 12/2003 | Pessoa .................... H04B 3/23 381/66 |
| 2004/0203454 A1 | 10/2004 | Rogers |
| 2014/0369536 A1* | 12/2014 | Kirkwood .............. H04R 25/55 381/312 |
| 2015/0296288 A1* | 10/2015 | Anastas ............... H04R 1/1041 381/77 |
| 2017/0019743 A1 | 1/2017 | Tull |
| 2018/0035232 A1 | 2/2018 | Dufosse et al. |

\* cited by examiner

SYSTEMS AND METHODS TO DISRUPT PHASE CANCELLATION EFFECTS WHEN USING HEADSET DEVICES

BACKGROUND OF THE INVENTION

Field of the Invention

The present invention relates generally to the field of Audio Processing Technology, and more particularly to Systems and Methods of Preprocessing Audio provided to headset devices such that phase cancellation effects are disrupted thus preserving the integrity of the intended headset audio when a headset device is utilized in certain acoustical environments, such as a theater where synchronized playback of same or similar audio occurs in both the headset device and speakers in surrounding acoustical environment.

Description of the Related Art

Headset manufacturers utilize Phase Cancelling to reduce unwanted noise (ref. U.S. Pat. No. 5,182,774, Noise Cancelling Headset). In such cases, the headset manufacturers desire Phase Cancellation. There are other cases where Phase Cancellation is undesirable.

Content providers for alternate language, assisted listening and descriptive video for cinema, television and other applications utilize headsets to disseminate their content. Consumers of such content who utilize headsets in certain acoustical environments, such as a theater where synchronized playback of same or similar audio occurs in both the headset device and speakers in surrounding acoustical environment, experience Phase Cancellation effects causing the headset wearer to perceive the audio as reduced in volume and distorted.

Due to the speed of sound in air and technical limitations of synchronizing two audio sources, audio from the headset and audio from the external speaker source (cinema, television or other audio source) arrives at the headset wearer's ears at slightly different times. The delayed arrival of an audio source results in that audio source being 'Out of Phase'. The 'In Phase' audio from the headset and 'Out of Phase' audio from the external speakers are then summed together at the headset wearer's ears, and thusly, phase cancelling one another. Phase cancelling effects as described are undesirable and adversely affect playback of intended audio for headset users.

BRIEF SUMMARY OF THE INVENTION

The present invention of Systems and Methods of Preprocessing Headset Audio disrupt Phase Cancellation effects by summing a random acoustical noise with the original headset audio track and providing this altered headset audio track to the headset.

The altered headset audio track disrupts Phase Cancellation effects and preserves the integrity of the intended headset audio in certain acoustical environments where headset phase cancelling effects occur, such as a theater where synchronized playback of same or similar audio occurs in both the headset device and speakers in surrounding acoustical environment.

The alterations of the headset audio tracks are nearly imperceptible to the headset wearer.

In this regard, a headset audio preprocessing method includes storing an audio track in memory of a mobile computing device, receiving in a microphone of the mobile computing device, contemporaneously played back audio, acquiring acoustic noise such as pink noise or other acoustic noise, including dithered noise, synchronizing playback of the stored audio track with the contemporaneously played back audio and summing the acquired acoustic noise with the synchronized playback of the stored audio track in order reduce phase cancelation effects otherwise present in the synchronized playback of the stored audio track.

In one aspect of the embodiment, the contemporaneously played back audio is included as part of a motion picture played in a movie theater. In another aspect of the embodiment, the mobile computing device is a mobile phone.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method in which acoustic noise is summed with the Original Headset Audio Track to create an Altered Headset Audio Track. The Altered Headset Audio Track is then provided to the headset device. In accordance with an embodiment of the invention, a device can add a specific level of pink noise, or other acoustic noise, such as dithered noise, to an audio track given an original audio track. In this regard, pink noise is Lf noise that is a signal or process with a frequency spectrum such that the power spectral density (energy or power per frequency interval) is inversely proportional to the frequency of the signal. In pink noise, each octave (halving/doubling in frequency) carries an equal amount of noise energy. Pink noise stands in contrast with white noise which has equal intensity per frequency interval.

By way of example, pink noise may include any noise with a power spectral density of the form $$S(f) \propto \frac{1}{f^a}$$

where f is frequency, and 0<α<2, with exponent α usually close to 1.

Figure 1:
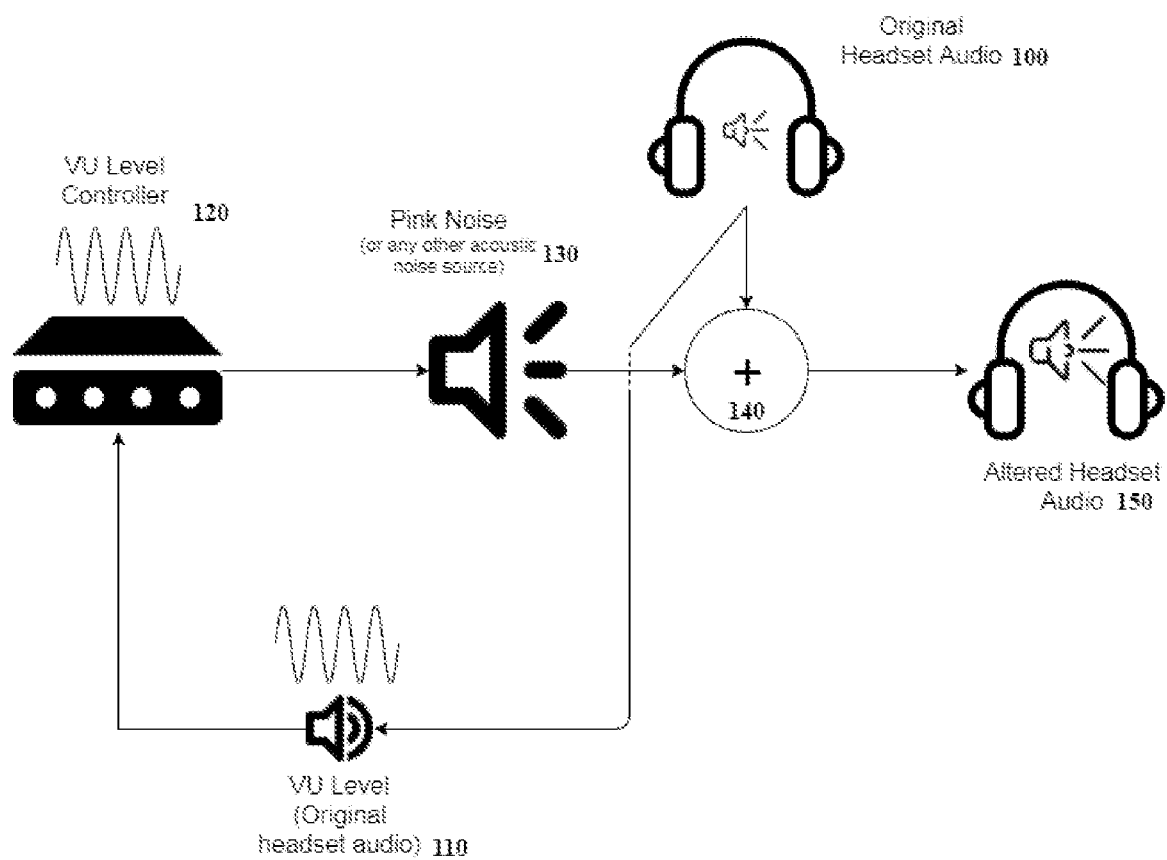
FIG. 1 is a pictorial illustration of a process for disrupting phase cancellation effects when using headset devices.

In further illustration, FIG. 1 pictorially shows a process for disrupting phase cancellation effects when using headset devices. As shown in FIG. 1, an original headset audio track 100 is processed and its (V)olume (U)nit level 110 is determined. A VU level controller 120 utilizes original VU level 110 to create a specific pink noise or other acoustic noise 130. The pink noise or other acoustic noise 130 is then combined with original headset audio 100 in summation process 140. The result of this summation process 140 is a new altered headset audio 150 that effectively eliminates perceptible phase cancellation effects.

Figure 2:
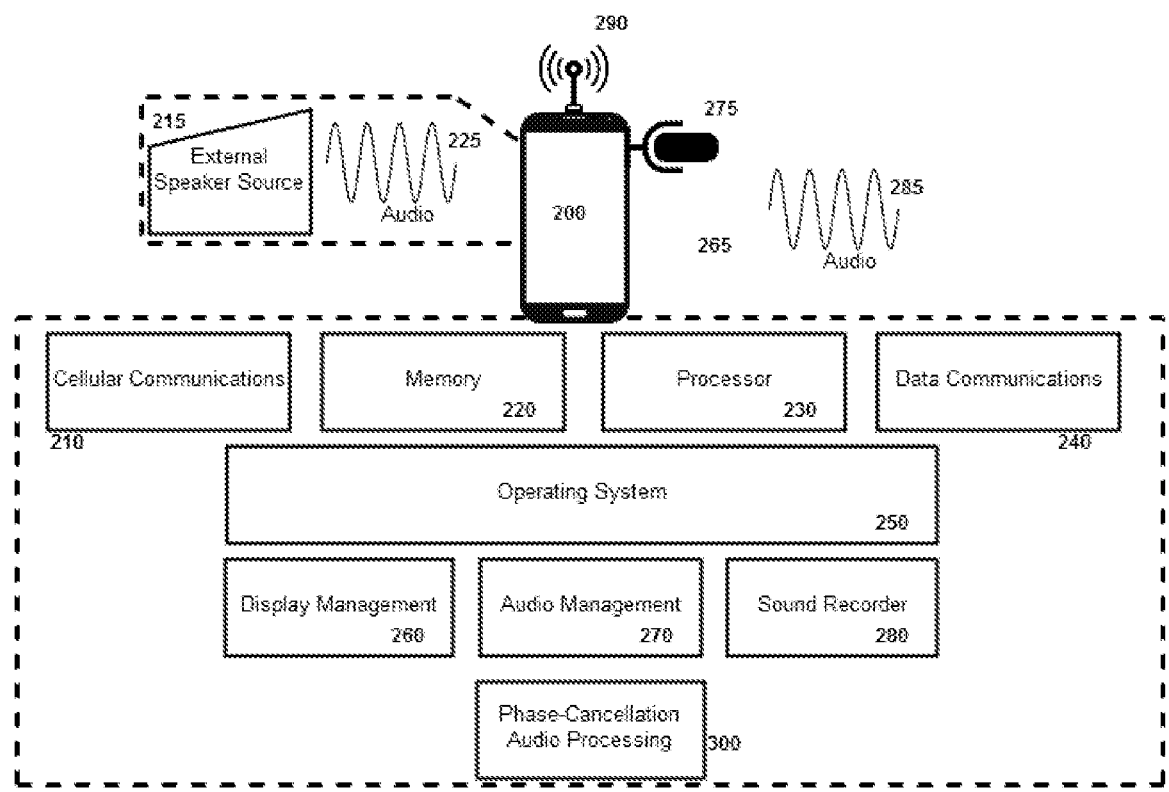
FIG. 2 is a schematic illustration of a data processing system configured for a phase cancellation disruption method; and, FIG. 3 is a flow chart illustrating a process for disrupting phase cancellation effects when using headset devices.

The process described in connection with FIG. 1 can be implemented in a data processing system. In further illustration, FIG. 2 schematically shows a data processing system configured for a phase cancellation disruption method. The system can include a mobile device 200, for instance a smart phone, tablet computer or personal digital assistant. The mobile device 200 can include at least one processor 230 and memory 220. The mobile device 200 additionally can include cellular communications circuitry 210 arranged to support cellular communications in the mobile device 200, as well as data communications circuitry 240 arranged to support data communications.

An operating system 250 can execute in the memory 220 by the processor 230 of the mobile device 200 and can support the operation of a number of computer programs, including a sound recorder 280. Further, a display management program 260 can operate through the operating system 250 as can an audio management program 270. Of note, a phase cancellation disruption audio processing module 300 can be hosted by the operating system 250. The phase cancellation disruption audio processing module 300 can include program code that, when executed in the memory 220 by the operating system 250, can act to disrupt phase cancellation effects through audio output circuitry of 265 of external audio 225 emitted from external speaker source 215.

In this regard, the program code of the phase cancellation disruption audio processing module 300 is enabled to detect external audio 225 provided by an external speaker source 215 through microphone 275. The program code of the phase cancellation disruption audio processing module 300 is able to determine the volume of audio 225 emitted from external speaker source 215 using microphone 275. Using this volume information, the program code of the phase cancellation disruption audio processing module 300 can determine whether the VU level of the applied acoustic noise from audio 225 is to be raised or lowered. These changes are then combined with original audio 225 to produce a new audio track 285 which has no perceptible phase cancellation effects. Audio 285 can then be played through speaker 265 of a mobile device 200.

Figure 3:
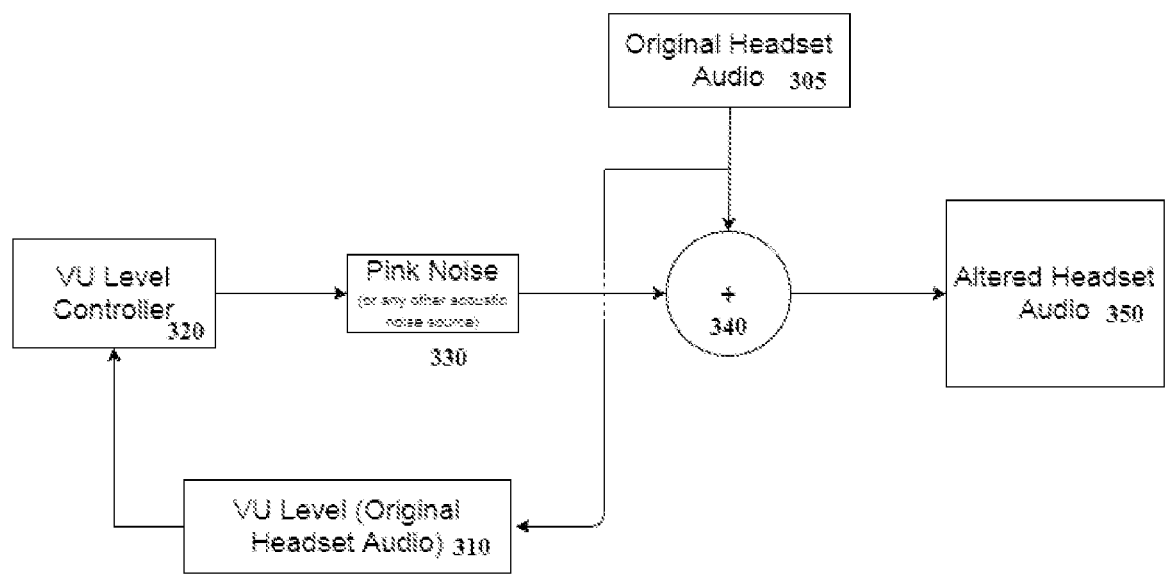

In even yet further illustration of the operation of the phase cancellation disruption audio processing module 300, FIG. 3 is a flow chart illustrating a process for disrupting phase cancellation effects when using headset devices. Original headset audio 305 is analyzed by the program code which determines the VU level 310 of the original headset audio 305. A VU level controller 320 then adjusts the VU level of the original headset audio 305; for quiet section of the headset audio 305, the VU level is lowered; for louder sections of the headset audio 305, the VU level is raised. The changing of these levels by VU level controller 320 produces pink noise 330. Pink noise 330 is then added to the original headset audio 305 in summation process 340 to produce a new altered headset audio 350. Altered headset audio 350 has no perceptible phase cancellation effects.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A headset audio preprocessing method comprising:
    storing an audio track in memory of a mobile computing device;
    receiving in a microphone of the mobile computing device, contemporaneously played back audio;
    synchronizing playback of the stored audio track with the contemporaneously played back audio;
    acquiring acoustic noise by determining a volume unit (VU) level of the stored audio track, adjusting the VU level of the stored audio track to a volume unit level of the acquired acoustic noise by lowering the VU level of the acquired acoustic noise for quiet sections of the audio track and raising the VU level of the acquired acoustic noise for louder sections of the audio track; and,
    summing the acquired acoustic noise with the synchronized playback of the stored audio track in order reduce phase cancelation effects present in the synchronized playback of the stored audio track.

2. The method of claim 1, wherein the acoustic noise is pink noise.

3. The method of claim 1, wherein the acoustic noise is dithered noise.

4. The method of claim 1, wherein the contemporaneously played back audio is included as part of a motion picture played in a movie theater.

5. The method of claim 1, wherein the mobile computing device is a mobile phone.

6. A computer program product for headset audio preprocessing, the computer program product comprising:
    a non-transitory computer readable storage medium comprising a memory device having computer readable program code embodied therewith, the computer readable program code comprising:
    storing an audio track in memory of a mobile computing device;
    receiving in a microphone of the mobile computing device, contemporaneously played back audio;
    synchronizing playback of the stored audio track with the contemporaneously played back audio;
    acquiring acoustic noise by determining a volume unit (VU) level of the stored audio track, adjusting the VU level of the stored audio track to a volume unit level of the acquired acoustic noise by lowering the VU level of the acquired acoustic noise for quiet sections of the audio track and raising the VU level of the acquired acoustic noise for louder sections of the audio track; and,
    summing the acquired acoustic noise with the synchronized playback of the stored audio track in order reduce phase cancelation effects present in the synchronized playback of the stored audio track.

7. The computer program product of claim 6, wherein the acoustic noise is pink noise.

8. The computer program product of claim 6, wherein the acoustic noise is dithered noise.

9. The computer program product of claim 6, wherein the contemporaneously played back audio is included as part of a motion picture played in a movie theater.

10. The computer program product of claim 6, wherein the mobile computing device is a mobile phone.

* * * * *